United States Patent
Zoualfaghari et al.

(10) Patent No.: US 11,695,632 B1
(45) Date of Patent: Jul. 4, 2023

(54) MANAGEMENT AND CONTROL ACROSS HETEROGENEOUS EDGE DEVICES OF A CLIENT NETWORK USING DEVICE ABSTRACTIONS

(71) Applicant: Amazon Technologies, Inc., Seattle, WA (US)

(72) Inventors: Mohammadhossein Zoualfaghari, Woodbridge (GB); Ajay Bhimrao Rane, Irvine, CA (US); Robin Satish Harwani, Frisco, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/810,321

(22) Filed: Jun. 30, 2022

(51) Int. Cl.
*G06F 15/177* (2006.01)
*H04L 41/084* (2022.01)
*H04L 41/0895* (2022.01)
*H04L 41/08* (2022.01)

(52) U.S. Cl.
CPC ...... *H04L 41/0843* (2013.01); *H04L 41/0883* (2013.01); *H04L 41/0895* (2022.05)

(58) Field of Classification Search
CPC ............. H04L 41/0843; H04L 41/0895; H04L 41/0883
USPC .......................................... 709/220, 223–225
See application file for complete search history.

(56) References Cited

U.S. PATENT DOCUMENTS

| | | | |
|---|---|---|---|
| 8,250,590 B2* | 8/2012 | Katari | G06F 9/541 719/328 |
| 9,311,140 B2 | 4/2016 | Raghu et al. | |
| 9,912,494 B2 | 3/2018 | Nethi et al. | |
| 2013/0003798 A1* | 1/2013 | Goldburg | H04L 12/2856 375/222 |
| 2019/0387011 A1* | 12/2019 | Du | H04L 63/20 |
| 2021/0359897 A1* | 11/2021 | Shaked | H04L 12/281 |

* cited by examiner

*Primary Examiner* — Duyen M Doan
(74) *Attorney, Agent, or Firm* — Robert C. Kowert; Kowert, Hood, Munyon, Rankin & Goetzel, P.C.

(57) ABSTRACT

Automatic onboarding, management, and control across heterogeneous edge devices of a client network using device abstractions may be performed (e.g., different types of edge devices manufactured by different vendors). A device onboarding and integration service may emulate, by a first device abstraction, an edge device of a client network, where the edge device is a first type of device. The service emulates, by a second device abstraction, the edge device as a second type of edge device (e.g., from a different vendor/ uses a different API). The service updates a state of the first device abstraction based on a state of the edge device. The service then updates a state of the emulating, by a second device abstraction, the edge device as a second type of edge device. The second device abstraction sends its updated state to an application at the client network.

20 Claims, 9 Drawing Sheets

US 11,695,632 B1

MANAGEMENT AND CONTROL ACROSS HETEROGENEOUS EDGE DEVICES OF A CLIENT NETWORK USING DEVICE ABSTRACTIONS

BACKGROUND

The Internet of Things (IoT) is a phrase given for the interconnection of computing devices scattered around the globe within the existing internet infrastructure. Individuals and organizations may use any number of IoT devices (also referred to herein as "edge devices") to perform a variety of tasks. For example, a user may purchase a keypad from a vendor that may be used to enter a code to arm or disarm a home security system. The user may also purchase a smart light bulb that can be turned on or off remotely (e.g., using a smart phone app).

The processes of configuring an edge device for use at a user's home network may include onboarding the edge device at a service provider's network. The onboarding of an edge device may involve many different steps, such as connecting to the home network and the service provider network, getting the device verified and registered at the provider network, and installing software onto the edge device. Manually onboarding an edge device may be a burdensome and time-consuming process for user, particularly when different types of devices from different vendors/manufacturers need to be added to the user's home network. Even after the user successfully configures edge devices for use at the home network, the user may be unable to manage or control different types of edge devices using a particular device or application, due to incompatibility between different types of devices (e.g., devices from different vendors/manufacturers).

Figure 1:
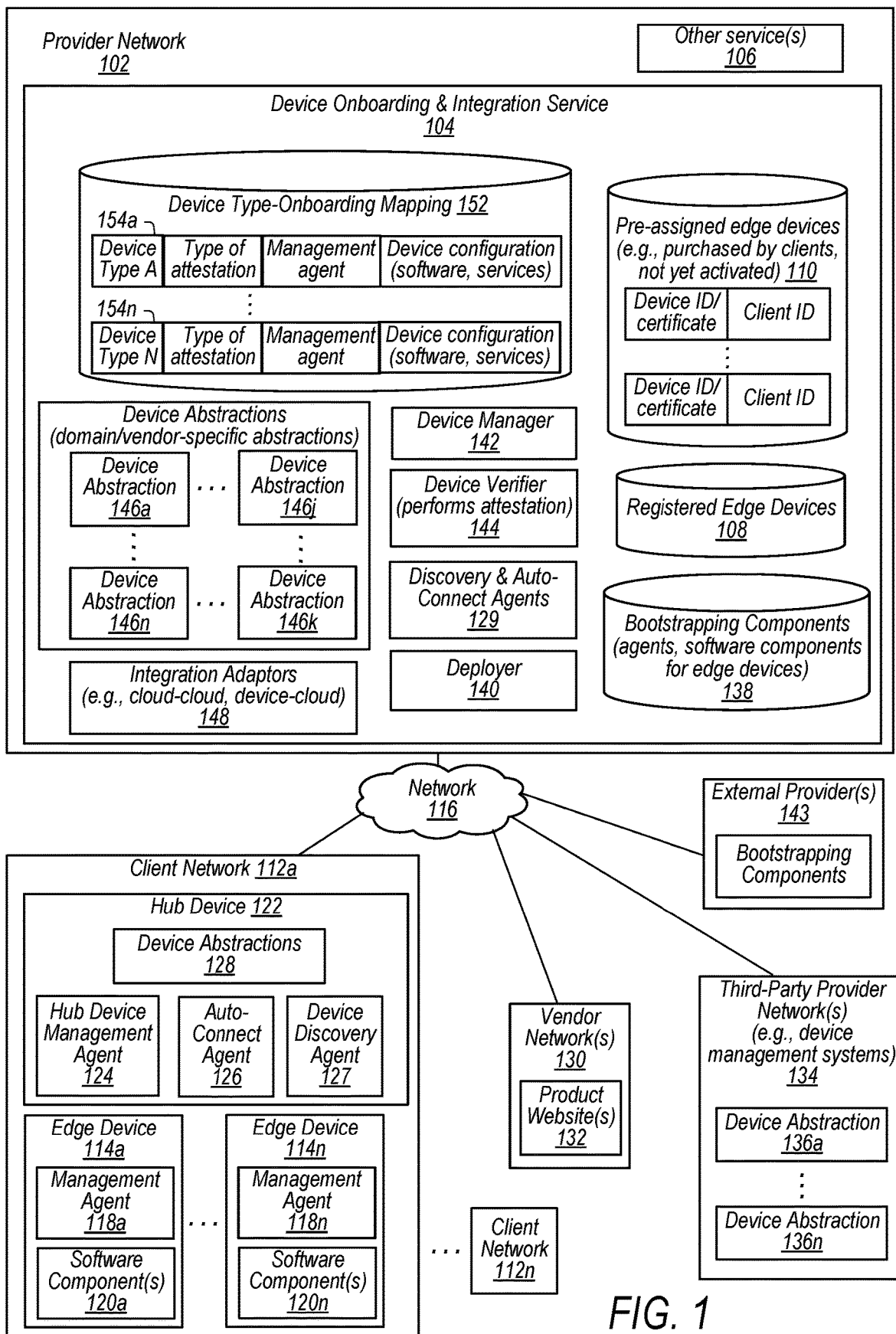
FIG. 1 is a logical block diagram illustrating a system for automatic onboarding of heterogeneous edge devices onto a client network, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments for automatic onboarding of different types of edge devices (e.g., heterogeneous edge devices) onto a client network and a service provider network, according to some embodiments. In embodiments, a device onboarding and integration service may automatically perform at least some or all of the onboarding process for different types of edge devices to be used at a client network.

For example, the device onboarding and integration service may receive a device identifier (ID) and determine a type of edge device to be used at the client's network. Based on the type of edge device, the service may select a particular type of device attestation to be used to verify the edge device. The device onboarding and integration service may also establish a secure connection with the edge device and register the edge device. The device onboarding and integration service may send a particular device management agent and client certificate to the edge device to enable communication with the service. The device management agent may also send an indication of different locations for the device to download components and/or an indication of services the device will subscribe to (e.g., in order for the edge device to bootstrap/configure itself and onboard to the service).

In various embodiments, two or more edge devices may be considered different types of edge devices (e.g., heterogenous edge devices) if they have been manufactured by different device vendors (e.g., have different hardware and/or software components from each other) and/or use a different application programming interface (API) to interact with other devices and applications (e.g., to send information or commands to other devices). A device that uses one API may be unable to use its API to interact with another device or application that uses a different API. For example, a camera from one vendor may be unable to send its updated state (e.g., newly collected images) to another edge device or application that uses a different API of another vendor.

The systems and methods described herein may also be employed in various combinations and in various embodiments for management and control across different types of edge devices of a client network (e.g., heterogeneous edge devices) using device abstractions, according to some embodiments. In embodiments, a device onboarding and integration service may emulate, by a first device abstraction, an edge device of the client's remote network, where the edge device is a first type of edge device (e.g., vendor Y device). The device onboarding and integration service may also emulate, by a second device abstraction, the edge device as a second type of edge device.

At any point in time, the device onboarding and integration service may update the state of the first device abstraction based on an updated state of the edge device (e.g., by receiving information indicating a state of the edge device at the client's network). In various embodiments, the information may be received from a device abstraction of the edge device (e.g., located at the client's network or at a third-party provider network). The service may update the state of the second device abstraction to an updated state based on the updated state of the first device abstraction. The service may then send, from the second device abstraction to an application and/or device of the client's network, the updated state of the second device abstraction. By using device abstractions to emulate different types of devices, a device onboarding and integration service may allow a particular application at the client's network to interact with different types of devices that use different APIs of different vendors, even though the application only uses one particular API. For example, an edge device management application may display heterogenous edge devices of the client's network in the same view/pane (e.g., images from different types of cameras), even though the different edge devices use different APIs for interaction/communication.

As discussed herein, in various embodiments a device onboarding and integration service may implement automatic onboarding, management, and control across different types of edge devices of a client network using device abstractions. This may greatly reduce the amount of time and the amount of computing resources used to onboard and manage/control different types of edge devices, compared to traditional techniques (e.g., manually onboarding and/or managing different devices using separate device management applications).

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 9 and described below.

This specification begins with a description of a system for automatic onboarding of different types of edge devices onto a client network and a service provider network. The specification then describes a system for management and control across different types of edge devices of a client network using device abstractions. A number of different methods and techniques for automatically onboarding different types of edge devices onto a client and provider network as well as management and control across different types of edge devices are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for automatic onboarding of heterogenous edge devices onto a client network, according to some embodiments.

As shown, a provider network 102 includes a device onboarding and integration service 104 that implements automatic onboarding of different types of edge devices onto a client network. In the example embodiment, the provider network 102 also includes any number of other services 106, such as compute services and/or storage services that may also be used by any of the clients (e.g., by users and/or edge devices subscribed to service(s)). In embodiments, any of the compute and/or storage functionality described for the device onboarding and integration service 104 may be provided, at least in part, by one or more of the other services 106. For example, another IoT service may maintain a database of all the registered edge devices for each client of the device onboarding and integration service 104.

In the depicted embodiment, the device onboarding and integration service 104 includes registered edge devices 108 (e.g., an edge device registry) that stores data for any number of registered edge devices of each client of the service. The data may include identification data that uniquely identifies each edge device with respect to other edge devices of a client or any clients, as well as any other type of data that describes the edge device. For example, the registry may store, for any number of edge devices, a unique device ID, a client certificate, and/or a client identifier of a client that the device is registered for. In embodiments, a given edge device may be registered as a registered edge device of a client after the given edge device has been verified/authenticated for the client using a particular type/method of device attestation, as described herein.

As shown, the device onboarding and integration service 104 also includes pre-assigned edge devices 110 that stores data for any number of edge devices of each client of the service that have been pre-assigned to the client but not yet registered to the client. For example, when a client purchases an edge device using a product website of a vendor network, the service 104 may receive, from the product website, a unique identifier for the edge device (e.g., device ID and/or client certificate) and/or a client identifier (client ID) that uniquely identifies the client. When the service receives this information, it may store the information to pre-assigned edge devices (e.g., as device ID/certificate and a client ID), before the edge device is shipped to the client or connected to the client's network.

In an embodiment, when the service stores information for an edge device for a client as a pre-assigned edge device (e.g., as the result of a purchase/order), then the provider network 102 may be considered the "digital owner" of the edge device and associates the edge device (e.g., edge device ID/digital certificate) with the client (e.g., by storing information for the edge device ID/certificate and associating that information with the client ID, such as in pre-assigned edge devices 110 and/or other data stores). This may be considered the process of "binding" the edge device to the client (e.g., by associating the client ID/client's account with the digital certificate of the device). Therefore, the edge device may not be used by any other client and/or provider network, in embodiments.

In some embodiments, the client (e.g., the user and/or organization that purchased the edge device for installation at the client network) may be considered the "actual owner" or physical owner of the edge device. In embodiments, the "device journey" may be considered the journey of the physical edge device from the manufacturer to one or more retailers/distributers to the client's network for installation, whereas the "certificate journey" may be considered the journey of the device ID/certificate from a particular endpoint (e.g., from a retailer's provider network/website) through the internet and/or private networks to the service 104 of the provider network.

In embodiments, any number of clients of the device onboarding and integration service 104 may each have one or more remote client networks 112, and a given client network may include any number of edge devices. For example, client network 112*a* of a client may include any number of edge devices 114 of any number of different device types (e.g., devices made/provided by different vendors that manufacture and/or sell devices, devices that use different application programming interfaces (APIs) to interact/communicate with other devices). In embodiments, clients of the device onboarding and integration service 104 may use the device onboarding and integration service 104 through communication with the provider network 102 from a remote client network 112 of the corresponding client (e.g., via a wide area network 116, such as the internet).

As shown, a given edge device may include a management agent 118 (enabling communication between the edge device and the device onboarding and integration service for management of the edge device) and/or any number of other software components 120 (e.g., an operating system, execution environment, components of a software stack, etc.) that may be downloaded from the service and installed/executed on the edge device. In embodiments, a client network may include a hub device 122, which may be a particular type of edge device that manages and/or communicates with any number of the other edge devices of the client network.

A hub device 122 may include a hub device management agent 124 (enabling communication between the hub device and the device onboarding and integration service for management of the hub device). As shown, the hub device may download and install an auto-connect agent 126 and a device discovery agent 127 from the provider network (e.g., deployed from a datastore/deployer of discovery and auto-connect agents 129). The device discovery agent may include software that enables (e.g., by activating a wireless beacon signal) an edge device to automatically discover and connect to the local network using any suitable communication protocol (e.g., WiFi, LoRa). The auto-connect agent may include software that enables an edge device to automatically connect/authenticate with the provider network (e.g., through attestation/verification).

The hub device may also instantiate (e.g., initiate execution/execute) any number of edge device abstractions 128. In embodiments, a given device abstraction may emulate an edge device of the client's network (e.g., by updating state of the device abstraction based on a current state of the edge device and communicating its state with other device abstractions and/or devices/applications). For example, one of the edge device abstractions 128 may emulate the edge device 114*a* the client network 112*a*. In embodiments, a device abstraction for some or all of the edge devices 114 may be instantiated at the provider network and or locally at the hub device 122. Device abstractions at the hub device may allow edge device of different vendors to communicate with each other at the client network in the same/similar way as described herein for the provider network. Even if internet connectivity with the provider network is temporarily lost, the local device abstractions 128 allow the different types of edge devices to interact/communicate.

In embodiments, any number of vendor networks 130 may provide clients a way to order/purchase any number of different types of edge devices from different manufacturers and/or distributors/re-sellers (e.g., using a product website 132) for shipment to the client's facility/premises and installation on the client's network. As shown, any number of third-party networks 134 may each instantiate any number of edge device abstractions 136, where a given edge device abstraction 136 may emulate an edge device of a client's remote network. For example, the edge device abstraction 136*a* may emulate the edge device 114*a* of client network 112*a*.

In the depicted embodiment, the device onboarding and integration service stores any number of bootstrapping components 138 (device management agents, software components, etc.) that may be deployed by a deployer 140 to any number of edge devices of any client networks, where they are installed onto the edge devices. A device manager 142 may communicate with a management agent 118 of each edge device in order to perform various device management actions as described herein (e.g., downloading software/software updates to the device, obtaining information/state from the device). In embodiments, the deployer 140 and/or the device manager 142 may obtain any number of bootstrapping components from the bootstrapping components 138 of the provider network and/or from any number of external providers 143 or third-party provider networks 134. This allows the edge device (whether a bare metal device or a device with some pre-installed software) to obtain any software components from any number of internal or external locations in order to complete onboarding/configuration of the edge device. The device verifier 144 may perform various actions for edge device attestation and/or verification, as described herein.

In some embodiments, as part of the edge device onboarding/bootstrapping process, the service 104 may send an indication to the device (e.g., a "recipe") that specifies any number of external locations and/or internal locations at the provider network for the device to download software components from for installation at the device. For example, the edge device may first download a software component from an internal location. After successful installation of the component, the edge device may then connect with the next location specified by the recipe to download the next software component (e.g., from an external provider 143). Any number of components may be obtained and/or installed in such a manner, until the edge device is fully configured and/or onboarded with the local network and/or the service 104.

The device onboarding and integration service may instantiate any number of device abstractions 146. A given device abstraction may emulate an edge device of a client network (e.g., an edge device 114 or hub device 122) based on a state of the edge device of the client network, as described herein. Emulating a given edge device may include simulating behavior of the software and/or hardware of the edge device in order to allow the device abstraction to interact/communicate with other device abstractions and/or other edge devices/applications as if it were the physical edge device itself. In embodiments, any number of edge device abstractions 148 may emulate a corresponding edge device 114 based on a state of the edge device 114 (e.g., most recent state parameters obtained from the edge device, such as various values generated, collected, and/or stored at the edge device). For example, edge device abstraction 146*a* may emulate edge device 114*a* based on a state of the edge device 114*a*.

The device onboarding and integration service may also include a device type-onboarding mapping 152 that includes any onboarding information that may be used to allow the service to automatically onboard different types of edge devices. As shown, the mapping 152 may include any number of entries 154 for different types of devices that each indicate a type of attestation used to verify the edge device, a particular management agent (or type of agent) to be used and/or configured for the edge device, and device configuration (e.g., software components to be installed on the edge device/recipe of locations and/or any services that the device will subscribe to). In embodiments, as part of the onboarding process, the device may subscribe to any number of device services offered by the provider network and/or any other third-party provider network (e.g., the services may be specified as part of the recipe). As an example, a device may be an elevator sensor device that subscribes to a ticket generation service provided by the provider network 102. When the sensor device detects a malfunction in the elevator, then it may send a request to the ticket generation service to generate a repair ticket for the elevator.

In embodiments, after an edge device is turned on (e.g., powered up) at the client's site, it may discover the client's network (e.g., by detecting a beacon signal from the hub device/device discovery agent and transmitting a request to be added to the local network). The edge device may also establish a connection with the provider network. For example, the auto-connect agent may provide a network address/URL to the edge device, which the edge device sends a connection request to.

After the device onboarding and integration service establishes a connection with the edge device of the client's remote network (e.g., after the edge device uses the device discover agent and/or the auto-connect agent to request a connection), the service may receive, from the edge device, data that includes an identifier for the edge device. The identifier for the edge device may have been previously associated with the client (e.g., based on an order for the edge device on a product website). The service may determine, based on the identifier and/or other data from the edge device, a type of the edge device (e.g., a vendor that manufactured the device, APIs and/or communication protocol(s) used by the device).

Based on the type of the edge device (e.g., based on the device ID), the service may determine/select a type of device attestation from among different types of device attestations available to verify different types of edge devices (e.g., different types of attestation flows/sequences used to verify the device that are stored by the service). The service may then perform the selected type of device attestation to verify the edge device. In response to the verification of the edge device, the service may establish a secure connection with the edge device (e.g., a TLS connection) and register the edge device as a registered edge device of the client.

In various embodiments, the service may determine different types of attestations to perform (e.g., different flows to verify/authenticate the device), depending on what type of device the service identifies the edge device as (e.g., what category that the device belongs to). In an embodiment, devices that use different communication protocols (e.g., BLE vs Zigbee) are classified as different types of devices and/or devices that are managed by a third-party network are classified as a different type than devices not managed by a third-party network. In embodiments, devices may be classified into different types/categories based on particular applications and/or the particular communication protocols supported by the devices. In embodiments, devices that target a particular type of environment (e.g., smart home) may be categorized as a first type of device. Devices that support standards and/or protocols such as LWM2M, LoRa, NB-IoT, etc. may be classified as a second type of device. Devices that are managed by a third-party network may be classified as a third type. Devices considered larger in size, such as residential gateways and other universal customer premise equipment that use Fido device onboarding (FDO) may be classified as a fourth type.

The service may send, to the edge device, a device management agent. The device management agent may be configured to enable communication between the edge device and the device onboarding and integration service for management of the edge device (e.g., after the agent is installed/executed on the edge device).

Some types of edge devices may be managed or at least partially managed by a remote third-party provider network (e.g., a provider network that is owned or managed by a vendor that manufactured the edge device). In embodiments, the service may determine, based on the type of the edge device, a third-party provider network that is assigned to manage the edge device. As part of the onboarding process, the service may send an indication of the third-party provider network to the edge device (e.g., a website address/uniform resource locator (URL)).

In some embodiments, the device onboarding and integration service may instantiate/execute any number of device abstractions that are based on any of the edge devices of a client network. For example, the service may instantiate a first device abstraction of an edge device (e.g., device abstraction 146a of edge device 114a), where the first device abstraction emulates the edge device, and where a state of the first device abstraction is based on a state of the edge device (e.g., a change in state of the edge device results in the same/similar change in state of the device abstraction). The service may instantiate a second device abstraction (e.g., device abstraction 146n), as a different type of edge device than the edge device (e.g., uses a different API), wherein a state of the second device abstraction is based on a state of the first device abstraction. In embodiments, any number of additional device abstractions to any number of levels (e.g., a third device abstraction based on a state of the second device abstraction, a fourth based on a state of the third, and so on). Each level may include a device abstraction that is instantiated as a different type of edge device (e.g., uses a different API), allowing the edge device to communicate with any other type of edge device.

In embodiments, the service may instantiate a first device abstraction of an edge device, where the first device abstraction emulates the edge device, and where a state of the first device abstraction is based on a state of a device abstraction of another provider network (e.g., a third-party network/device management system). As discussed below, the state of the first device abstraction may receive, via an integration adaptor 148, a message from the other device abstraction of the other provider network that indicates an updated state of the other device abstraction. The integration adaptor may convert the message into a message that is compatible with an API used by the first device abstraction, and the state of the first device abstraction may be updated based on the converted message.

Different types of devices may be from different device vendors (e.g., manufactured by different vendors) and/or may interact with other edge devices/applications using different APIs. In an embodiment, the service may instantiate a first device abstraction of an edge device of a remote network of the client, where the first device abstraction is configured to emulate the edge device, and where the edge device is a first type of edge device from a first device vendor that interacts with other devices using a first API. The service may also instantiate a second device abstraction that is associated with the first device abstraction (e.g., its state is based on the state of the first device abstraction), where the second device abstraction is configured to emulate the edge device as a second type of edge device from a second device vendor that interacts with other devices using a second API. The service may update a state of the first device abstraction based on a state of the edge device and in response, update a state of the second device abstraction to an updated state based on the update of the state of the first device abstraction. The service may then cause the second device abstraction to provide, to an endpoint (application/device) of the remote network of the client in accordance with the second API, the updated state of the second device abstraction. This may allow an application at the client network to interact/communicate with the edge device as if it were the second type of edge device (e.g., manufactured by the second device vendor), even though the edge device was manufactured by the first device vendor.

In embodiments, the updating of the state of the first device abstraction is based on the updating of another device abstraction at another provider network (e.g., another device management system owned by a vendor that manufactured the edge device). For example, the service may receive via an integration adaptor, from another device abstraction of the edge device instantiated at another provider network, a message indicating the state of the edge device (the message may indicate the state of the other device abstraction, which is an indication of the state of the edge device itself) and then update the state of the first device abstraction based on the message received from the other provider network.

In some embodiments, the updating of the state of the first device abstraction is based on the updating of another device abstraction that has been instantiated at a hub device of the client network. For example, the service may receive, from another device abstraction of the edge device instantiated at a hub device of the remote network of the client, the message indicating the state of the edge device (the message may indicate the state of the other device abstraction, which is an indication of the state of the edge device itself) and then update the state of the first device abstraction based on the message received from the other device abstraction.

Figure 2:
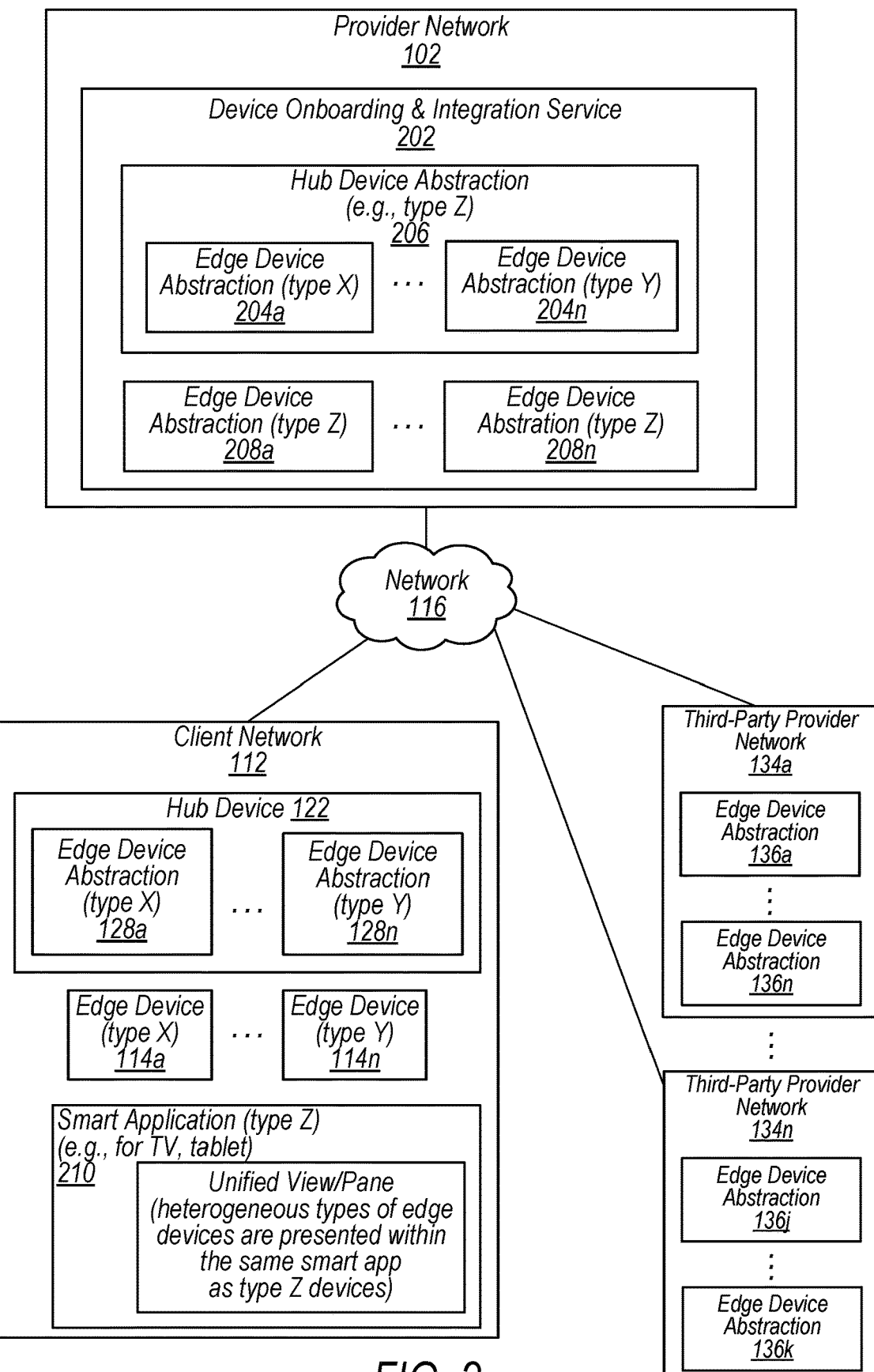
FIG. 2 is a logical block diagram illustrating a system for management and control across heterogeneous edge devices of a client network using device abstractions, according to some embodiments.

In embodiments, the updating of the state of the first device abstraction is based on the updating of a device abstraction of the hub device that includes the first device abstraction (FIG. 2 describes an example of a hub device abstraction instantiated at the service). For example, the service may receive via an integration adaptor, from the hub device of the remote network of the client, information indicating a state of the hub device (the state of the hub device may include the state of the edge device and any number of edge devices of the remote network) and then update the state of the device abstraction of the hub device based on the information indicating the state of the hub device (e.g., based on the state of the edge device that is included in the state of the hub device).

In an embodiment, the updating of the state of the first device abstraction is based on the updating of the edge device itself. For example, the service may receive (e.g., via an integration adaptor), from the edge device at the remote network of the client, a message indicating the state of the edge device and then update the state of the first device abstraction based on the message received from the edge device.

In embodiments, any number of different device abstractions may be instantiated at the device onboarding and integration service based on any number of edge devices at a client network, which may include any number of different types of edge devices. For example, using the techniques described herein (using device abstractions), a client network may include 10 different types of edge devices that each use a different API to communicate, but a management application at the client network may communicate with all 10 devices using a particular API in order to display the state of each device in the same view/pane. In embodiments, any combination of the above techniques of using device abstractions may be implemented. For example, one or more device abstractions may be updated based on another device abstraction at another third-party provider network, one or more device abstractions may be updated based on another device abstraction at a hub device, one or more device abstractions may be updated based on a device abstraction of the hub device, and/or one or more device abstractions may be updated based on communication with the edge device itself.

In various embodiments, any of the components/functionality of the device onboarding and integration service 104 may be performed by a third-party provider network (e.g., another device onboarding and integration service) to onboard the edge device. For example, the verifier 144, discovery and auto-connect agents 129, and/or deployer 140 may be implemented by a third-party provider network. By performing the techniques described herein, any number of edge devices of different types may be onboarded using different techniques specific to the type of device (e.g., different types of attestation, management agents, software components, etc.).

Therefore, embodiments may provide a unified human-readable interface (e.g., a unified view/pane that allows management of heterogeneous devices) as well as a unified machine-readable interface (e.g., ability for an application to communicate with heterogeneous edge devices) through the use of device abstractions. In embodiments, in response to onboarding and verification of an edge device, a bi-directional chain of trust may be established between the edge device, the client network, and the provider network (e.g., along a path of any number of levels of device abstractions).

Note that in some embodiments, a user may need to give permission to use any of the functions described herein. For example, the user may give permission to a third-party network for the device onboarding and integration service/provider network 102 to access/obtain data for an edge device managed by that third party network (e.g., in order for the device onboarding and integration service to obtain message from the device abstraction at the third-party network that indicate the current/updated state of the edge device).

FIG. 2 is a logical block diagram illustrating a system for management and control across heterogeneous edge devices of a client network using device abstractions, according to some embodiments. Although various examples described throughout may be for a home network, in various embodiments, any type of network may be used for any environment (e.g., industrial applications such as a manufacturing plant or assembly floor). Therefore, a client network may be a part of a user's home network or may be a part of a business or other organization for us in any type of business-related environment.

In embodiments, the device onboarding and integration service 202 may perform some or all of the functions described for the service 102 of FIG. 1. In some embodiments, any of the networks or components may of FIG. 2 may be the same or similar as those described for FIG. 1 or may be example embodiments of those networks or components. As in FIG. 1, any number of clients of the device onboarding and integration service 202 may each have one or more client networks 112, and a given client network may include any number of edge devices 114. As in FIG. 1, the client network 112 includes a hub device 122, which includes any number of edge device abstractions 128. For example, edge device abstractions 128a-128n may be device abstractions of edge devices 114a-114n. As depicted, any number of third-party provider networks may each include any number of edge device abstractions 136 of the client network 112 and other client networks.

As shown, the device onboarding and integration service 202 may include a hub device abstraction 206, which includes an edge device abstraction 204 that corresponds to each of the edge device abstractions 128 at the hub device. For example, edge device abstractions 204a-204n may correspond to edge device abstractions 128a-128n (e.g., the state of edge device abstractions 204 is based on the state of the corresponding edge device abstractions 128, which in turn are each based on the corresponding state of each edge devices 114).

In an embodiment, the hub device abstraction may interact/communicate with other devices as a particular type of device (e.g., type Z) that may provide state data of its "child" edge device abstractions (e.g., 204a-204n), even though some or all of its "child" edge device abstractions are not of type Z. For example, a hub device abstraction may interact as if it is a single device with three different sensor outputs (e.g., temperature, pressure, humidity), even though the temperature, pressure, and humidity are obtained from different edge device abstractions and the temperature, pressure, and humidity are each provided by a different edge device at the client network.

In embodiments, the service may instantiate any number of edge device abstractions 208 that are based on a corresponding edge device abstraction 204. For example, the state of edge device abstraction 208a may be based on the state of edge device abstraction 204a, the state of edge device abstraction 204a may be based on the state of edge device abstraction 128a, and the state of edge device abstraction 128a may be based on the state of the edge device 114a.

In the depicted example, edge device 114a is a type X edge device and edge device 114a is a type X edge device (e.g., they use different types of APIs and/or are from different vendors/manufacturers). Edge device abstraction 208a may emulate edge device 114a as a type Z edge device and edge device abstraction 208n may emulate edge device 114n as a type Z edge device. This may allow a type Z display application 210 (e.g., a smart app that interacts/communicates using a different API than type X or Y devices) at the client's network 112 to display the state of edge device 114a and 114n in the same unified view (e.g., user interface) as the state of other edge devices of type Z, even though type Y and X devices are incompatible with type Z devices (e.g., use different APIs). In embodiments, the use of the device abstractions may also allow a user of the display device to control edge device 114a and 114n (e.g., through commands at the user interface that are sent back through the device abstractions).

In some embodiments, the flow of information/state change using device abstractions may be bidirectional. For example, if a user or application causes a change of state to the edge device abstraction 208a, then the state of edge device abstraction 204a may be updated to match the state of edge device abstraction 208a, then the state of edge device abstraction 128a may be updated to match the state of edge device abstraction 204a, then the state of edge device 114a may be updated to match the state of edge device abstraction 128a. This may allow changes to a device abstraction (e.g., based on a command or any other trigger) to propagate to the edge device itself. In embodiments, this may occur for device abstractions at third-party provider networks as well. For example, a change of state to edge device abstraction 208n may propagate to edge device abstraction 136n (e.g., via the integration adaptor 148), when may then propagate to the edge device 114n.

Figure 3:
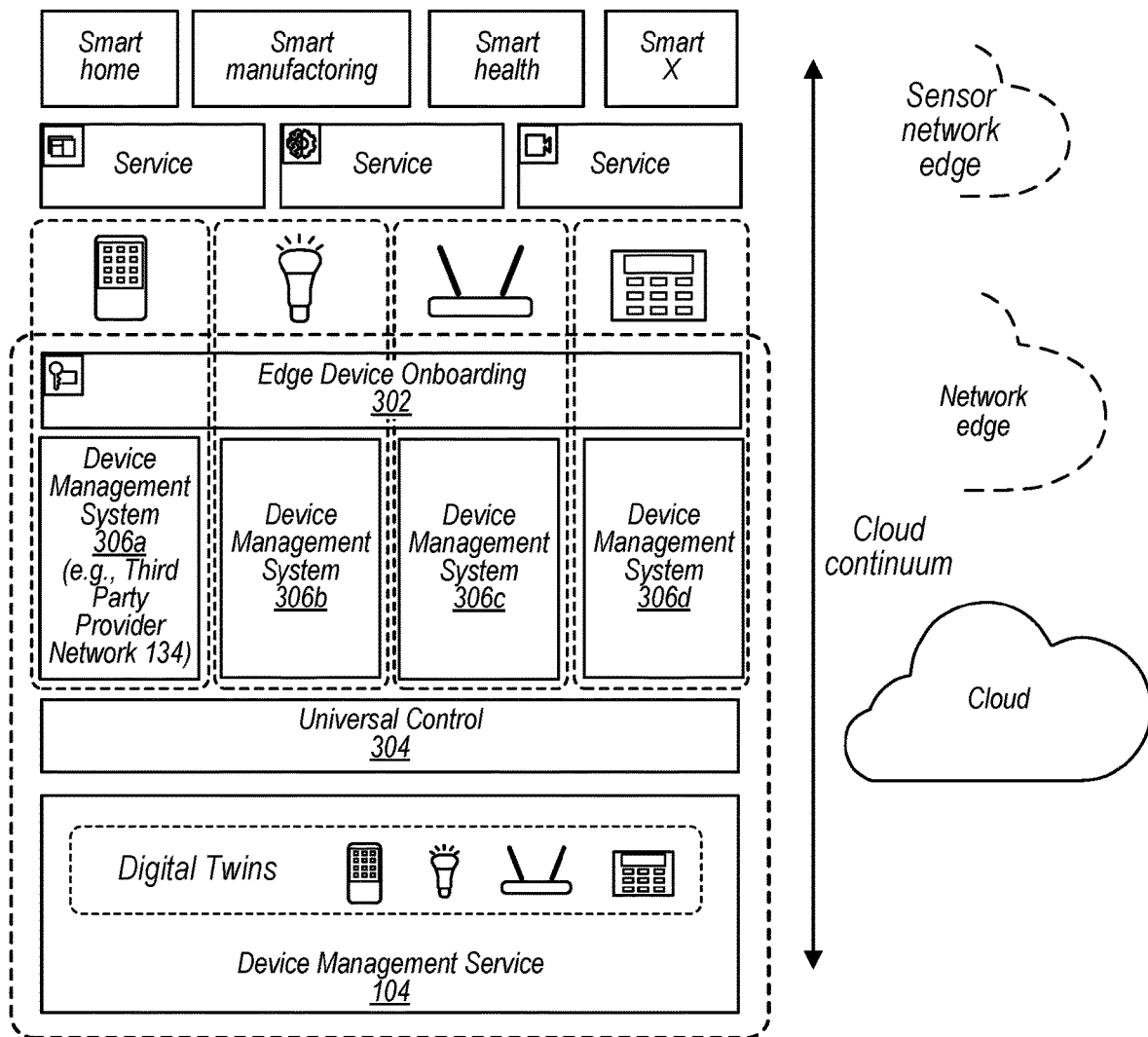
FIG. 3 illustrates onboarding and universal control of heterogeneous devices along a cloud continuum, according to some embodiments.

FIG. 3 illustrates onboarding and universal control of heterogeneous edge devices along a cloud continuum, according to some embodiments.

In the depicted example, a device onboarding and integration service 104 may enable a "layer" of edge device onboarding 302 and universal control 304 that automatically manages onboarding and communication between different types of edge devices using various techniques described herein. As shown, different edge devices may be at least partially managed by different device management systems 306 (e.g., different third-party provider networks). For example, the device management systems 306 may be the third-party provider networks 134 of FIG. 1. By implementing automatic onboarding and universal control for a variety of different device types, the device onboarding and integration service 104 enables seamless and efficient operation of different edge devices with each other. As shown, any number of different services may be implemented based on any number of the different types of edge devices, enabling a "smart" X implementation across any environment (e.g., home/personal, manufacturing/industrial IoT, health applications).

Figure 4:
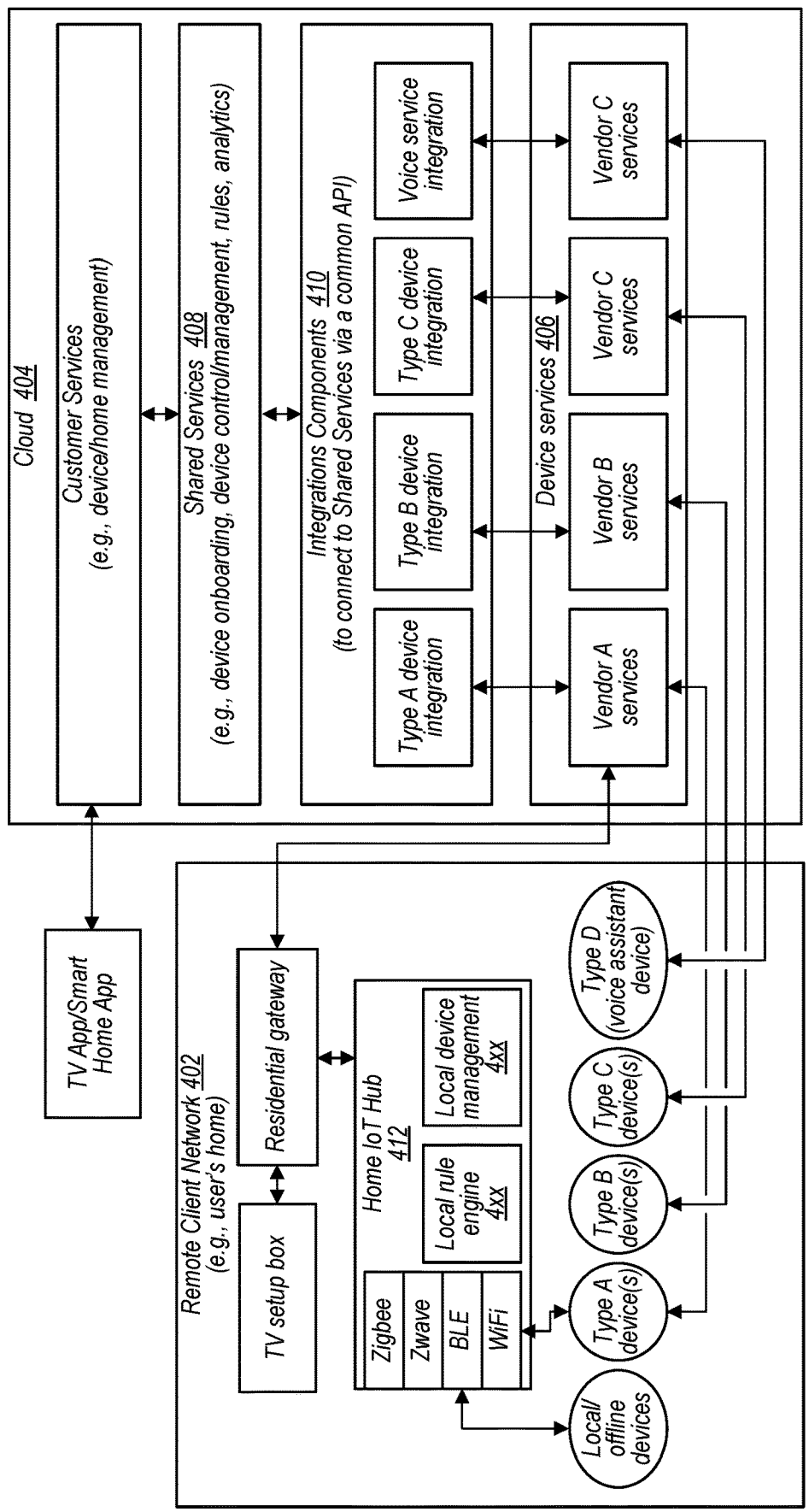
FIG. 4 is a logical block diagram illustrating a system for management and control across heterogeneous edge devices of a client network using device abstractions, according to some embodiments.

FIG. 4 is a logical block diagram illustrating a system for management and control across heterogeneous edge devices of a client network using device abstractions, according to some embodiments.

As shown, a remote client network 402 (e.g., at a user's home) may include various devices from various vendors of edge devices (e.g., smart home vendors (SHV)). In the example, the network may include a gateway connected to a TV setup box that runs a smart TV app. For each SHV offering device services over the internet, there may be a different set of APIs that allow communication with the different edge devices installed at the client network.

The cloud 404 may include different third-party networks that manage different types of devices (e.g., device services 406), and devices may communicate to shared services 408 (e.g., onboarding and integration service 104 and other services 106) using integration components (e.g., integration adapters 148). The home IoT hub 412 (e.g., hub device 122) may include a local rule engine and local device management (e.g., management agent 124). In embodiments, a user may use the local rule engine to create and implement rules for managing/controlling the operation of any number of different edge devices (e.g., devices from different vendors/ using different APIs). For example, the user may create a rule that turns off all smart lights in the house at 10 pm. The rule may cause the local device management to turn off all of the lights, even though the lights are from different vendors and/or use different APIs. As shown, the different types of devices may communicate using any number of different protocols (e.g., Zigbee, Zwave, BLE, WiFi). Furthermore, some devices may be managed locally and/or by using the onboarding and integration service (e.g., no third-party network manages the device).

Figure 5:
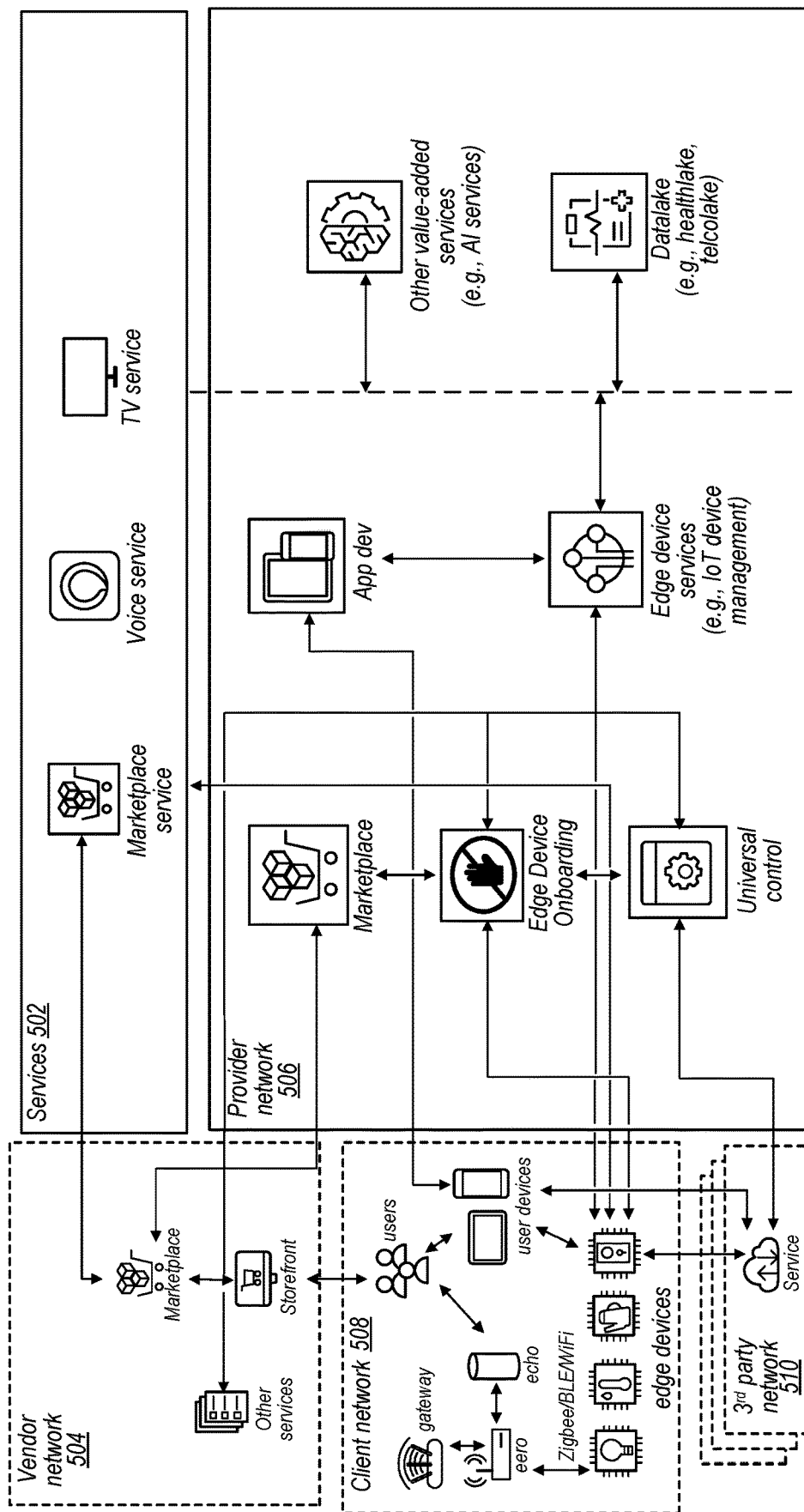
FIG. 5 is a logical block diagram illustrating a system for automatic onboarding, management, and control across heterogeneous edge devices of a client network using device abstractions, according to some embodiments.

FIG. 5 is a logical block diagram illustrating a system for automatic onboarding, management, and control across heterogeneous edge devices of a client network using device abstractions, according to some embodiments.

In the illustrated example, a client network may include different types of edge devices that use different communication protocols (e.g., Zigbee/BLE/WiFi). The provider network may receive a device ID when a user purchases an edge device (e.g., using services 502 of a network, such as a vendor network 504 or other network), and may associate that device ID with the client (e.g., with the client's existing account at the provider network).

A provider network 506 (e.g., provider network 102) may implement edge device onboarding and universal control, as well as various other IoT-related services (marketplace, app development, edge device management, AI services, data lake, etc.). A client network 508 may communicate with a third-party network 510, the provider network 506, and the vendor network 504 in various ways to accomplish automatic onboarding of heterogenous devices and management/control across heterogeneous devices using device abstractions, as described herein.

Figure 6:
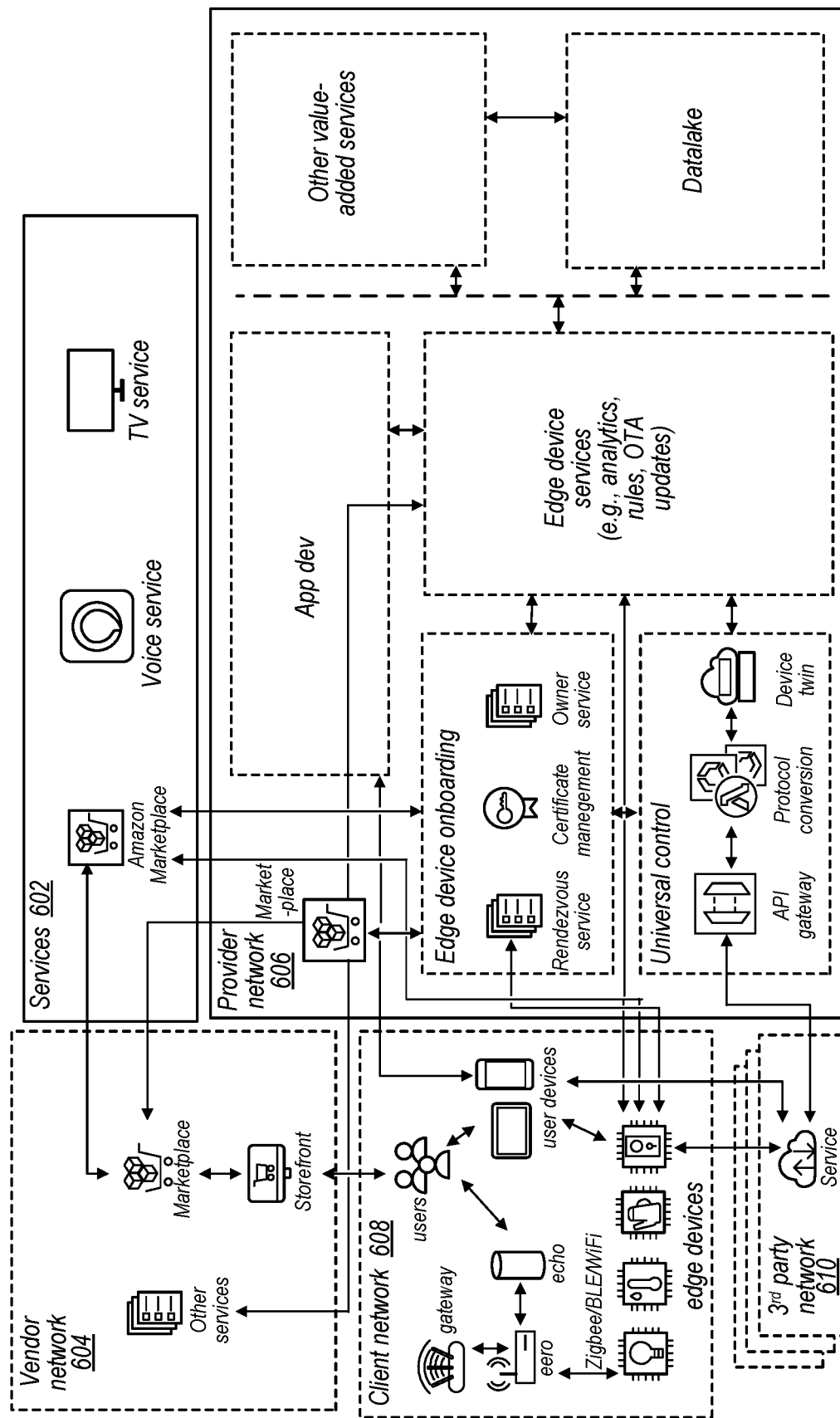
FIG. 6 is a logical block diagram illustrating a system for automatic onboarding, management, and control across heterogeneous edge devices of a client network using device abstractions, according to some embodiments.

FIG. 6 is a logical block diagram illustrating a system for automatic onboarding, management, and control across heterogeneous edge devices of a client network using device abstractions, according to some embodiments.

In the illustrated example, a client network may include different types of edge devices that use different communication protocols (e.g., Zigbee/BLE/WiFi). The provider network may receive a device ID when a user purchases an edge device (e.g., using services 602 of a network, such as a vendor network 604 or other network), and may associate that device ID with the client (e.g., with the client's existing account at the provider network).

A provider network 606 (e.g., provider network 102) may implement edge device onboarding and universal control, as well as various other IoT-related services (marketplace, app development, edge device management, AI services, data lake, etc.). A client network 608 may communicate with a third-party network 610, the provider network 606, and the vendor network 604 in various ways to accomplish automatic onboarding of heterogenous devices and management/control across heterogeneous devices using device abstractions, as described herein.

As depicted, the "edge device onboarding" functionality of the provider network may implement various services (e.g., rendezvous service, certificate management, owner service) that may perform any of the functionality described herein in order to onboard an edge device. The "universal control" functionality of the provider network may implement various services (e.g., API gateway, protocol conversion/integration adaptors, device twin/device abstraction) that may perform any of the functionality described herein in order to onboard an edge device.

Figure 7:
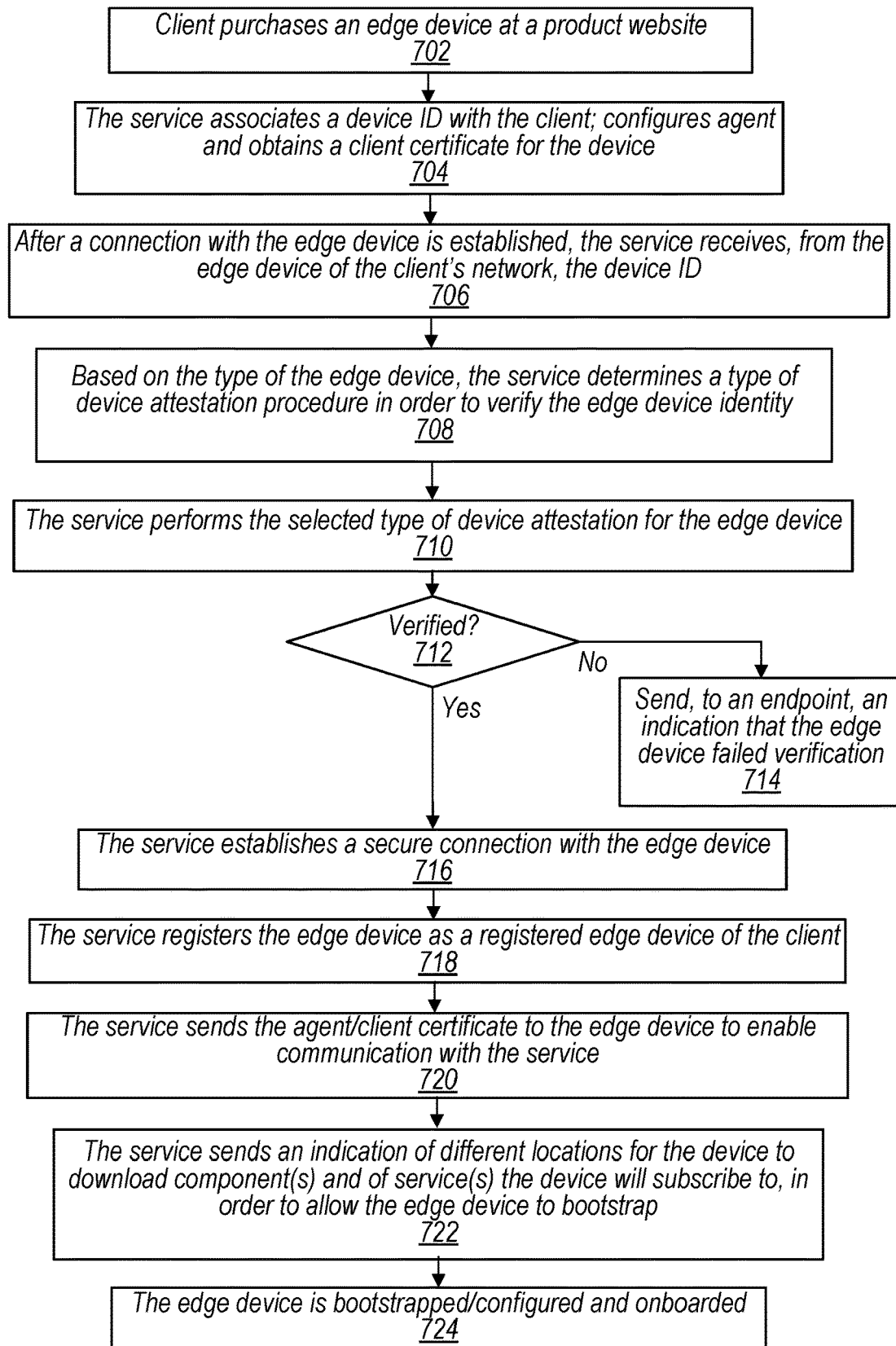
FIG. 7 is a high-level flowchart illustrating various methods and techniques to implement automatic onboarding of heterogeneous edge devices onto a client network, according to some embodiments.

FIG. 7 is a high-level flowchart illustrating various methods and techniques to implement automatic onboarding of heterogeneous edge devices onto a client network, according to some embodiments. In various embodiments, any of the functionality described for any portions of the flowcharts 7-8 may be performed by any of the components of FIGS. 1-6 and/or 9.

Figure 8:
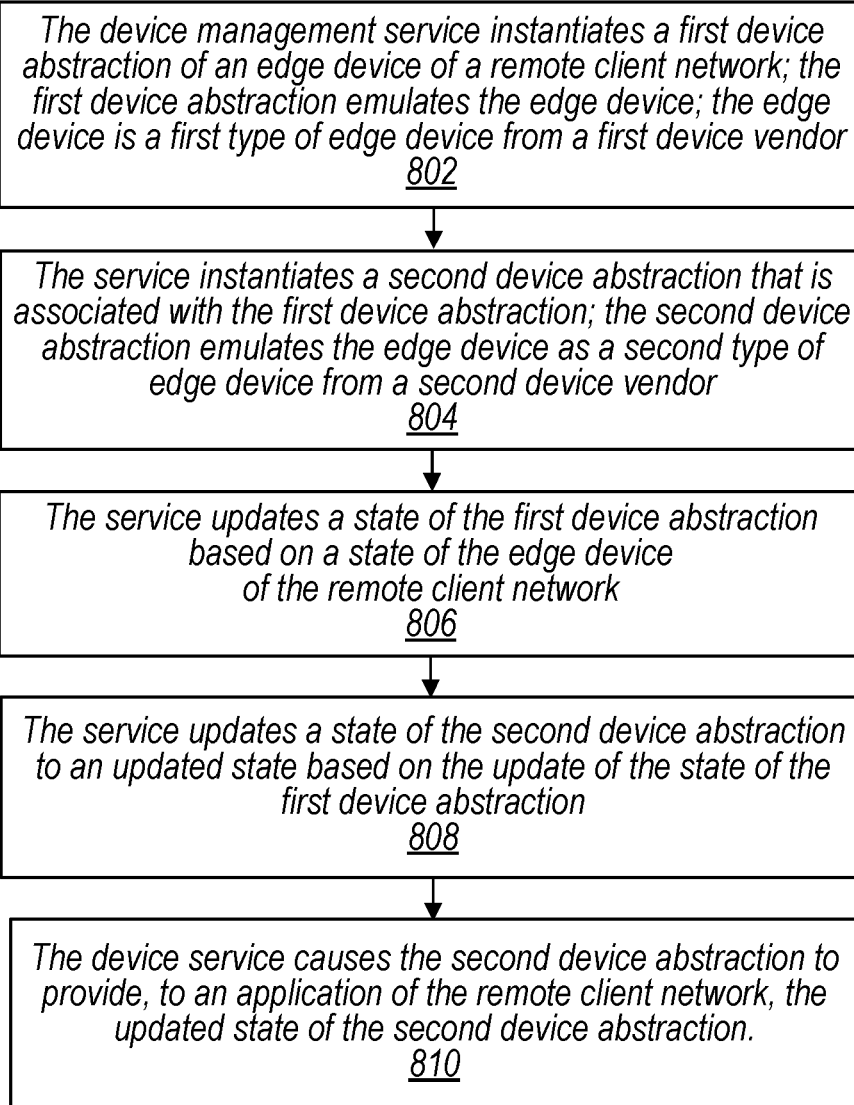
FIG. 8 is a high-level flowchart illustrating various methods and techniques to implement management and control across heterogeneous edge devices of a client network using device abstractions, according to some embodiments.

These techniques, as well as the techniques discussed with regard to FIG. 8, may be implemented using components or systems as described above with regard to FIGS. 1-6, as well as other types of components or systems, and thus the following discussion is not intended to be limiting as to the other types of systems that may implement the described techniques. For example, any of the techniques may be implemented by a device onboarding and integration service of a provider network and/or by a local service/application of a client network.

At block 702, a client purchases an edge device at a product website. At block 704, the device onboarding and integration service associates a device ID of the edge device with the client (e.g., at least a portion of a universal product code (UPC) for the device, media access control address (MAC) for the device, or any other identifier that uniquely identifies the edge device with respect to other edge devices). The service may also configure a device management agent and obtain a client certificate for the device.

At block 706, after a connection with the edge device is established, the service receives, from the edge device of the client's remote network, the device ID. At block 708, the service determines, based on the type of edge device (e.g., based on the device ID), a type of device attestation (from multiple types of device attestations available) in order to verify the identity of the edge device.

At block 710, the service performs the selected type of device attestation for the edge device. At block 712, if the service cannot verify the edge device based on the device attestation, then at block 714, the service sends, to an endpoint, an indication that the edge device failed verification. If the service verifies the identity of the edge device, then at block 716, the service establishes a secure connection with the edge devices. At block 718, the service registers the edge device as a registered edge device of the client. At block 720, the service sends the agent and client certificate to the edge device to enable additional communication between the edge device and the service (e.g., after installation at the edge device).

At block 722, the service sends an indication of different locations for the device to download component(s) and locations of service(s) the device will subscribe to, in order to allow the edge device to bootstrap itself. At block 724, the edge device bootstraps itself and is onboarded to the service.

FIG. 8 is a high-level flowchart illustrating various methods and techniques to implement management and control across heterogeneous edge devices of a client network using device abstractions, according to some embodiments.

At block 802, the device onboarding and integration service instantiates a first device abstraction of an edge device of a remote client network; the first device abstraction emulates the edge device (the edge device is a first type of edge device from a first device vendor). At block 804, the service instantiates a second device abstraction that is associated with the first device abstraction; the second device abstraction emulates the edge device as a second type of edge device from a second vendor.

At block 806, the service updates a state of the first device abstraction based on a state of the edge device of the remote client network. At block 808, the service updates a state of the second device abstraction to an updated state based on the update of the state of the first device abstraction. At block 810, the service causes the second device abstraction to provide, to an application of the remote client network, the updated state of the second device abstraction.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors.

The program instructions may implement the functionality described herein (e.g., the functionality of the device onboarding and integration service, other services, edge devices, and any other components/devices that implement the techniques described herein). The various methods as illustrated in the figures and described herein represent example embodiments of methods. The order of any method may be changed, and various elements may be added, reordered, combined, omitted, modified, etc.

Figure 9:
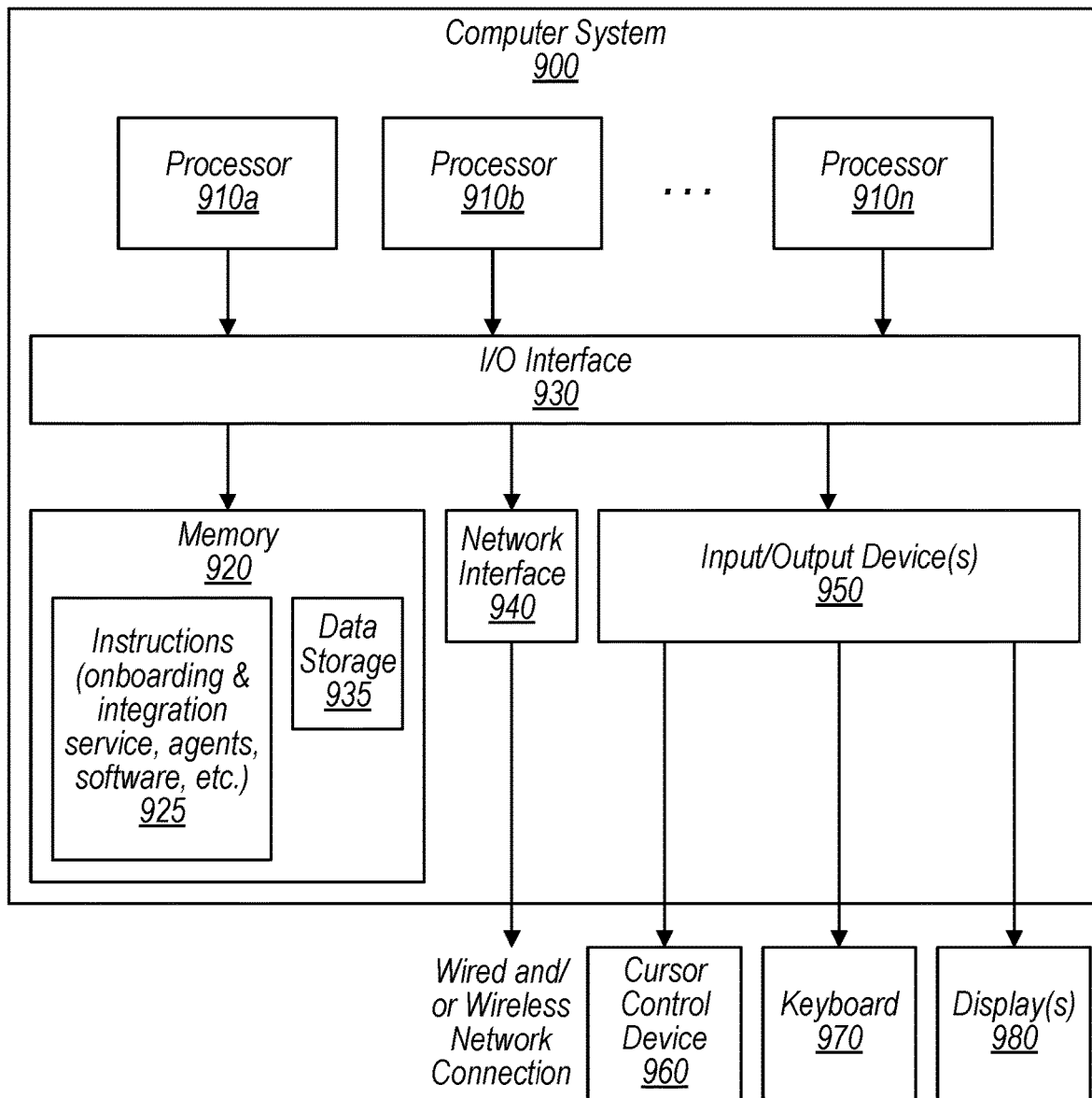
FIG. 9 is a block diagram illustrating an example computing system, according to some embodiments.

Embodiments to implement automatic onboarding of different types of edge devices onto a client network, and management and control across different types of edge devices of a client network using device abstractions, as described herein may be executed on one or more computer systems, which may interact with various other systems or devices. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Display(s) may include standard computer monitor(s) and/or other display systems, technologies or devices, in one embodiment. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions, in one embodiment. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 920 may store program instructions 925 and/or data accessible by processor 910, in one embodiment. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the device onboarding and integration service, other services, edge devices, and any other components/devices, etc.) are shown stored within system memory 920 as program instructions 925 and data storage 935, respectively. In other embodiments, program instructions and/or data may be received, sent or stored upon different types of computer-accessible media or on similar media separate from system memory 920 or computer system 900.

A computer-accessible medium may include non-transitory storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940, in one embodiment.

In one embodiment, I/O interface 930 may be coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900, in one embodiment. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900, in one embodiment. Multiple input/output devices 950 may be present in computer system 900 or may be distributed on various nodes of computer system 900, in one embodiment. In some embodiments, similar input/output devices may be separate from computer system 900 and may interact with one or more nodes of computer system 900 through a wired or wireless connection, such as over network interface 940.

As shown in FIG. 9, memory 920 may include program instructions 925 that implement the various embodiments of the systems as described herein, and data store 935, comprising various data accessible by program instructions 925, in one embodiment. In one embodiment, program instructions 925 may include software elements of embodiments as described herein and as illustrated in the Figures. Data storage 935 may include data that may be used in embodiments (e.g., configuration data, usage limits, etc.). In other embodiments, other or different software elements and data may be included.

Those skilled in the art will appreciate that computer system 900 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 900 may be transmitted to computer system 900 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors and one or more memories, wherein the one or more memories have stored thereon instructions, which when executed by the one or more processors, cause the one or more processors to implement a device onboarding and integration service for a plurality of clients of a provider network, wherein the device onboarding and integration service is configured to, for a given client:
      instantiate a first device abstraction of an edge device of a remote network of the client, wherein the first device abstraction is configured to emulate the edge device, and wherein the edge device is a first type of edge device from a first device vendor that interacts with other devices using a first application programming interface (API);
      instantiate a second device abstraction that is associated with the first device abstraction, wherein the second device abstraction is configured to emulate the edge device as a second type of edge device from a second device vendor that interacts with other devices using a second API;
      update a state of the first device abstraction based on a state of the edge device;
      in response to the update of the state of the first device abstraction, update a state of the second device abstraction to an updated state based on the update of the state of the first device abstraction; and
      cause the second device abstraction to provide, to an application of the remote network of the client in accordance with the second API, the updated state of the second device abstraction.

2. The system as recited in claim 1, wherein to update the state of the first device abstraction, the device onboarding and integration service is configured to:
   receive via an integration adaptor, from another device abstraction of the edge device instantiated at another provider network, a message indicating the state of the edge device; and
   update the state of the first device abstraction based on the message received from the other provider network.

3. The system as recited in claim 1, wherein to update the state of the first device abstraction, the device onboarding and integration service is configured to:
- receive, from another device abstraction of the edge device instantiated at a hub device of the remote network of the client, the message indicating the state of the edge device; and
- update the state of the first device abstraction based on the message received from the remote network of the client.

4. The system as recited in claim 3, wherein a device abstraction of the hub device of the remote network of the client is instantiated at the provider network, and wherein to update the state of the first device abstraction, the device onboarding and integration service is configured to:
- receive via an integration adaptor, from the hub device of the remote network of the client, information indicating a state of the hub device; and
- update the state of the device abstraction of the hub device based on the information indicating the state of the hub device.

5. The system as recited in claim 1, wherein the device onboarding and integration service is configured to:
- instantiate a third device abstraction of an additional edge device of the remote network of the client, wherein the third device abstraction is configured to emulate the additional edge device, and wherein the additional edge device is a third type of edge device from a third device vendor that interacts with other devices using a third API that is different than the first API and the second API;
- receive via an integration adapter, from another device abstraction of the additional edge device instantiated at another provider network, a message indicating a state of the additional edge device; and
- update a state of the third device abstraction based on the message received from the other provider network.

6. A method, comprising:
- performing, by one or more computing devices of a provider network:
  - emulating, by a first device abstraction, an edge device of a remote network of a client, wherein the edge device is a first type of edge device;
  - emulating, by a second device abstraction, the edge device as a second type of edge device;
  - updating a state of the first device abstraction based on a state of the edge device;
  - updating a state of the second device abstraction to an updated state based on the updating of the state of the first device abstraction; and
  - sending, from the second device abstraction to an application of the remote network of the client, the updated state of the second device abstraction.

7. The method as recited in claim 6, wherein updating the state of the first device abstraction comprises:
- receiving via an integration adaptor, from another device abstraction of the edge device instantiated at another provider network, a message indicating the state of the edge device; and
- updating the state of the first device abstraction based on the message received from the other provider network.

8. The method as recited in claim 6, wherein updating the state of the first device abstraction comprises:
- receiving, from another device abstraction of the edge device at the remote network of the client, a message indicating the state of the edge device; and
- updating the state of the first device abstraction based on the message received from the remote network of the client.

9. The method as recited in claim 6, wherein updating the state of the first device abstraction comprises:
- receiving via an integration adaptor, from the edge device at the remote network of the client, a message indicating the state of the edge device; and
- updating the state of the first device abstraction based on the message received from the edge device.

10. The method as recited in claim 6, further comprising:
- emulating, by a hub device abstraction, a hub device of the remote network of the client, wherein the hub device abstraction comprises the first device abstraction.

11. The method as recited in claim 6, wherein edge devices of the first type interact with other edge devices using a first API, and wherein edge devices of the second type interact with other edge devices using a second API that is different than the first API or communication protocol.

12. The method as recited in claim 6, further comprising:
- emulating, by a third device abstraction, the edge device as a third type of edge device;
- updating a state of the first device abstraction based on a state of the edge device;
- updating a state of the third device abstraction based on the updating of the state of the second device abstraction; and
- sending, from the third device abstraction to an endpoint, the updated state of the third device abstraction.

13. The method as recited in claim 6, further comprising:
- emulating, by a third device abstraction, an additional edge device of the remote network of the client, wherein the additional edge device is a third type of edge device;
- receiving via an integration adapter, from another device abstraction of the additional edge device at another provider network, a message indicating a state of the additional edge device; and
- updating a state of a third device abstraction based on the message received from the other provider network.

14. The method as recited in claim 13, further comprising:
- emulating, by a fourth device abstraction, the additional edge device as the second type of edge device;
- updating a state of the fourth device abstraction based on the updated state of the third device abstraction; and
- sending, from the fourth device abstraction to the application, updated state of the fourth device abstraction.

15. One or more non-transitory computer-accessible storage media storing program instructions that when executed on or across one or more processors of a provider network cause the one or more processors to:
- emulate, by a first device abstraction, an edge device of a remote network of a client, wherein the edge device is a first type of edge device;
- emulate, by a second device abstraction, the edge device as a second type of edge device;
- update a state of the first device abstraction based on the state of the edge device;
- update a state of the second device abstraction to an updated state based on the update of the state of the first device abstraction; and
- send, from the second device abstraction to an application of the remote network of the client, the updated state of the second device abstraction.

16. The one or more storage media as recited in claim 15, wherein to update the state of the first device abstraction, the program instructions when executed on or across the one or more processors further cause the one or more processors to:
  receive via an integration adaptor, from another device abstraction of the edge device instantiated at another provider network, a message indicating the state of the edge device; and
  update the state of the first device abstraction based on the message received from the other provider network.

17. The one or more storage media as recited in claim 15, wherein to update the state of the first device abstraction, the program instructions when executed on or across the one or more processors further cause the one or more processors to:
  receive, from another device abstraction of the edge device at the remote network of the client, a message indicating the state of the edge device; and
  update the state of the first device abstraction based on the message received from the remote network of the client.

18. The one or more storage media as recited in claim 15, wherein to update the state of the first device abstraction e, the program instructions when executed on or across the one or more processors further cause the one or more processors to:
  receive via an integration adaptor, from the edge device at the remote network of the client, a message indicating the state of the edge device; and
  update the state of the first device abstraction based on the message received from the edge device.

19. The one or more storage media as recited in claim 15, wherein edge devices of the first type interact with other edge devices using a first API, and wherein edge devices of the second type interact with other edge devices using a second API that is different than the first API.

20. The one or more storage media as recited in claim 15, wherein edge devices of the first type are manufactured by a first vendor and devices of the second type are manufactured by a different vendor.

* * * * *